Figure 1:
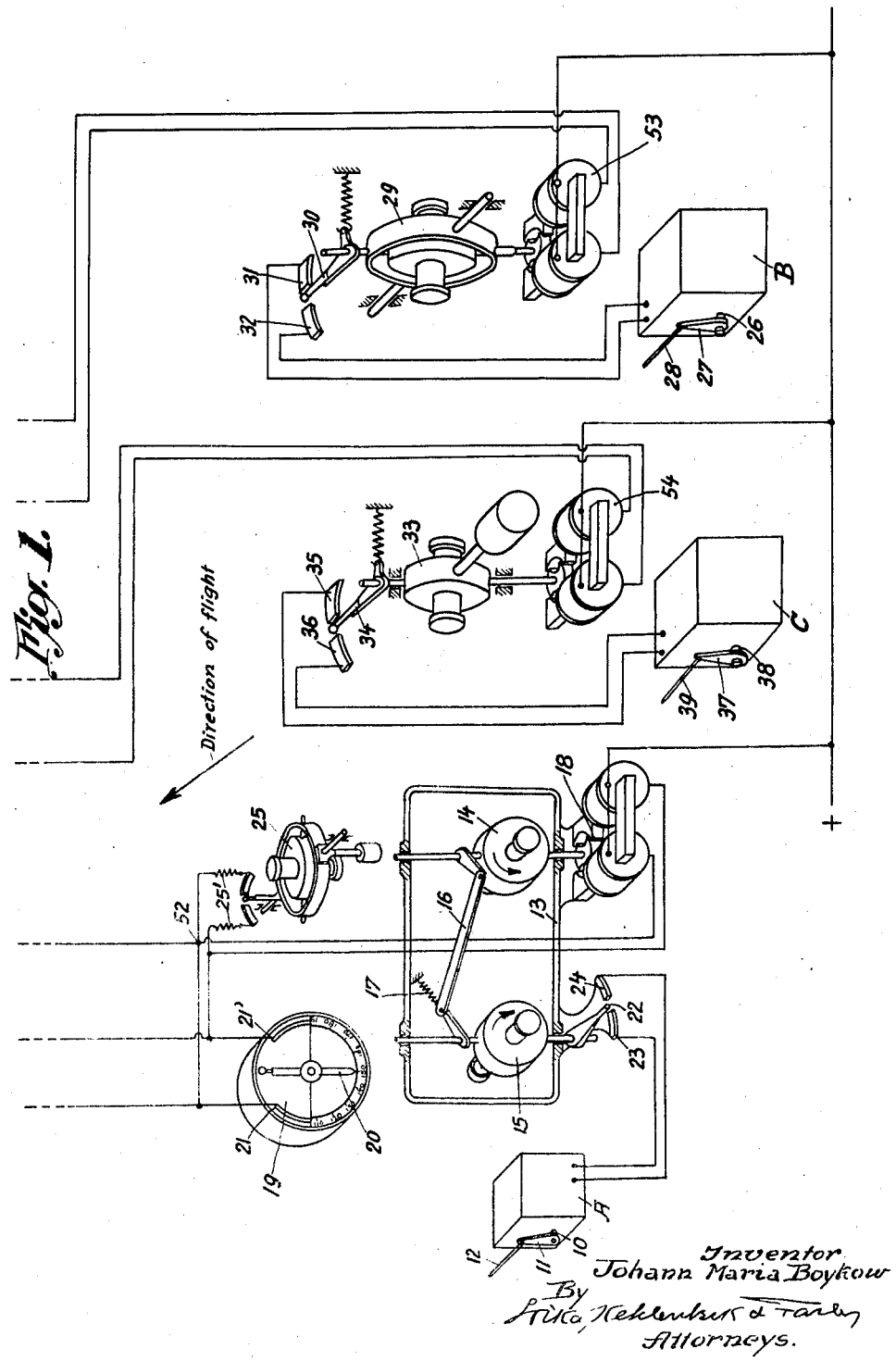

Aug. 2, 1932.  J. M. BOYKOW  1,869,840
STABILIZING APPARATUS
Original Filed Oct. 4, 1929  2 Sheets-Sheet 1

Inventor
Johann Maria Boykow
By
Stika, Kehlenbeck & Farley
Attorneys.

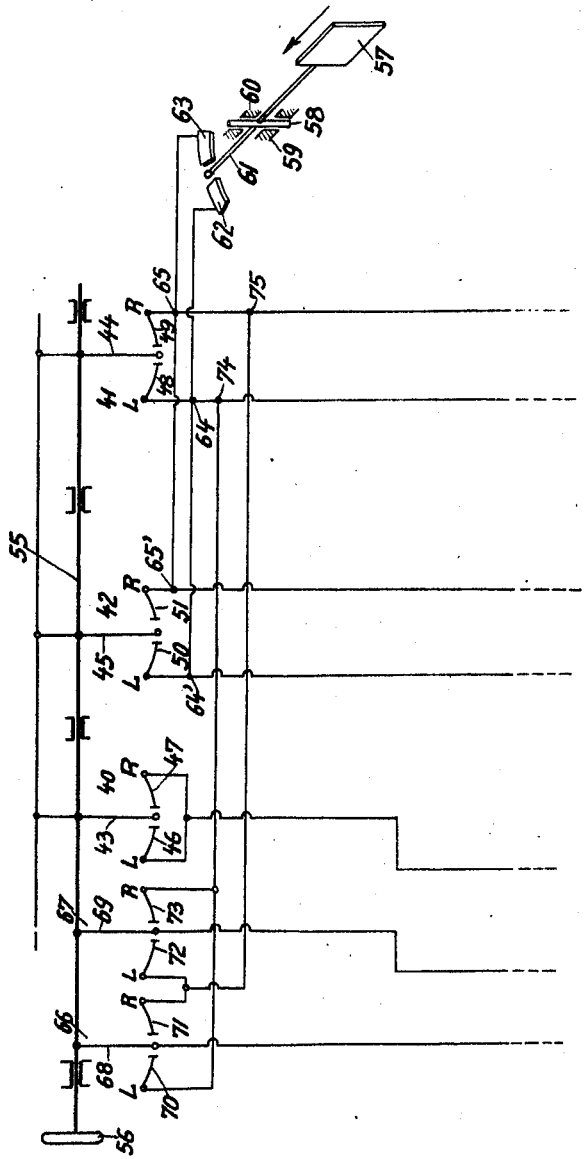

Patented Aug. 2, 1932

1,869,840

UNITED STATES PATENT OFFICE

JOHANN MARIA BOYKOW, OF BERLIN-LICHTERFELDE-WEST, GERMANY, ASSIGNOR TO MESSGERATE BOYKOW, G. M. B. H., OF BERLIN-LICHTERFELDE-WEST, GERMANY

STABILIZING APPARATUS

Application filed October 4, 1929, Serial No. 397,178, and in Germany October 6, 1928. Renewed May 13, 1932.

My invention relates to stabilizing apparatus and more particularly to automatic stabilizing apparatus for use in airplanes.

The object of my invention is to provide means for stabilizing an airplane automatically when flying in a curve. With this object in view the invention provides means for causing—when flying in a curve—the electrical controlling devices for stabilizing the airplane on a straight course, to exert an additional stabilizing influence upon the airplane. Other objects and the means for reducing them to practice will become apparent by the following specification in connection with the drawings.

In these drawings an apparatus according to the invention is diagrammatically represented by way of example, the drawings showing the control devices for the elevating rudder, for the steering rudder and for the ailerons, and also the electrical connections necessary for realizing the invention.

Figs. 1 and 2 constitute a diagrammatical representation of the device.

In the drawings A is an electric motor controlling the elevating rudder (not shown). To the axis 10 of motor A a crank lever 11 is fixed to the other end of which a connecting rod 12, a wire connection or the like is fastened which is adaped to move the elevating rudder upon rotation of the motor A.

When flying in a straight course the motor A is controlled by suitable means represented in the drawings in a general manner. These means may be similar to the apparatus patented to me by U. S. Patent No. 1,709,457 dated 16th April, 1929. Of this apparatus only the main parts are shown in the drawings. To these parts belong: The inertia frame 13 with two gyroscopes 14 and 15 mounted therein. These gyroscopes are driven by electric current and rotate in opposite directions at high speed. The two gyroscopes 14 and 15 are connected by links 16 in such a manner that the gyroscopes may precede only oppositely to each other. A spring 17 keeps the axes of the gyroscopes parallel to each other in zero position. Upon the precession axis of gyroscope 14 a rotating relay 18 is mounted which is controlled by a measuring device such as speedometer 19. This preferably is a normal air pressure device, and is provided with a contact arm 20 and two segmental contact pieces or regulable resistances 21 and 21'. These contact pieces are electrically connected to the relay 18 so that changes in the speed of the airplane cause an angular movement about the precession axis of the gyroscope in a manner well understood by those skilled in the art. On the precession axis of gyroscope 15 a contact arm 22 is fixed which is adapted to move over contact pieces 23 or 24 respectively upon a precession caused by the above mentioned change in speed. The contact pieces 23 and 24 being electrically connected to the motor A a movement of contact arm 22 will effect a displacement of the elevating rudder in one sense or the other.

The relay 18 further is electrically conneced to a gyroscopic pendulum 25 which is connected in parallel to the speedometer 19 and likewise is adapted to control the relay 18 and thus cause movement of contact arm 22 and displacement of the elevating rudder when it is intended to oppose any variations from the horizontal position of the plane.

The torques effected by the two instruments 19 and 25 respectively are adjusted in such a manner with respect to each other, for instance by means of resistances 25', that the influence of the speedometer 19 is greater than that of the pendulum 25.

The steering rudder (not shown) is controlled by an electric motor B on the axis 26 of which is mounted a crank lever 27 which is connected to a connecting rod 28, a wire connection or the like leading to the steering rudder in order to move it when the motor B rotates.

When flying in a straight course the motor B and therefore the steering rudder solely is under the control of a direction indicator represented in the drawings by a gyroscopic pendulum 29 having a contact arm 30 adapted to move over resistances 31 and 32 respectively which are electrically connected to motor B. The manner in which the steering rudder is controlled by this device does not form part of the present invention.

In a similar manner the ailerons (not shown) are operated and controlled by an indicator responding to the angular position about the longitudinal axis such as a gyroscope 33 adapted to keep the air plane in equilibrium about the longitudinal axis. This is effected by means of a contact arm 34 moving over resistances 35 and 36 respectively which are electrically connected to a motor C controlling the ailerons by means of crank lever 37 fixed to the motor axis 38 and connected to a connecting rod 39, a wire connection or the like. The manner in which the gyroscope 33 effects displacement of the ailerons on account of changes in the situation of the plane likewise forms no part of the present invention.

The above described automatic stabilizing equipment pilots the plane on a straight course. In a curve this equipment will not be sufficient to rightly pilot the plane. An additional device is, therefore, provided which forms the object of my present invention.

The object of this additional device is the correction of the control exerted by the above described equipment by means which may be called a "curve-switch" and which is set into operative position, and moved out of it, by hand.

The described stabilizing equipment works in such a manner for piloting the plane in a straight course that the plane is stabilized for instance with respect to speed or height by means of the elevating rudder alone. This is possible as the height directly depends upon the elevating rudder alone, and as the speed likewise (although indirectly) is regulable by the elevating rudder alone (if the output of the engine is left out of consideration). As soon, however, as the plane goes into a curve the influence of the elevating rudder is divided, by reason of the inclined position, into a vertical and a horizontal component. The elevating rudder, therefore, then works not only as such but at the same time as a steering rudder. On the other hand the steering rudder partly acts as an elevating rudder when the plane is in an inclined position. Thus the elevators and the rudder proper divide their functions. At an angle of 90° the elevators would become complete rudders, and the rudder would take over the function of the elevators. At angles less than 90° the division of the functions between elevators and rudder respectively depends on the sine of the angle of inclination which corresponds to the radius of the curve. Therefore, for stabilizing the plane in a curve it will not be sufficient, for instance for keeping the speed or the position of height, to control the elevating rudder by means of suitable measuring devices, but the steering rudder must likewise be put under the control of these measuring devices.

Further, when stabilizing the plane for flying in a curve, it must be taken into consideration that the elevating rudder must be displaced in correspondence with the inclination of the plane by a certain amount in order that the plane which is flying on the surface of a cone be not carried out of the curve.

All these corrections are effected by the additional means represented in the drawings.

First of all when flying in a curve it will be necessary to put the three control motors A, B, C under a constant influence which is in correspondence to the radius of the curve and to be measured according to the desired medium speed. There are provided for this purpose regulating devices 40 for the elevating rudder, 41 for the steering rudder and 42 for the ailerons. These regulating devices comprise contact arms 43, 44 and 45 respectively cooperating with resistances 46, 47 and 48, 49 and 50, 51 respectively. The resistances 46 and 47 are electrically connected to the electric leads described in connection with the means for controlling the motor A for the elevating rudder. This connection is made for instance at point 52 situated upon the connection leading from the speedometer 19 to the relay 18. The resistances 48 and 49 are electrically connected to a rotating relay 53 which is arranged on the precession axis of gyroscope 29 of the steering rudder's control motor B. The resistances 50 and 51 finally are electrically connected to a third relay 54 similar in construction to relays 18 and 53, relay 54 being arranged on the precession axis of gyroscope 33 which is influencing the motor C controlling the ailerons. The contact arms 42, 43 and 44 are electrically connected to one of the mains of the electric current system and preferably are mounted on a common shaft 55 provided with a hand wheel 56. The contact arms may, however, be arranged in any other suitable manner. (The regulating devices 40, 41 and 42 have been turned into the plane of the drawings for clarity's sake. In reality they are arranged in parallel planes each crossing the axis of shaft 55 at a right angle.)

The electrical connections of the regulating devices 40, 41 and 42 respectively are made so as to effect (by means of the change in the resistances 46 to 51) upon the electromagnetic controlling devices of the three motors A, B, C an influence corresponding to the chosen curve radius and to the desired speed. Instead of the resistances 46 to 51 other suitable means may be employed. Of the resistances shown in the drawings those marked with "R" are destined for a curve to the right, those marked with "L" for a curve to the left.

The motor B of the steering rudder is controlled by the following devices working jointly: the direction indicator 29 by means of regulating device 30 to 32, the regulating device 41 forming part of the curve-switch, a vane or similar device 57 and the speedometer 19 by means of regulating device 20, 21, 21'.

The vane 57 is mounted on a vertical axis 58 arranged outside of the disturbing area of the propeller. The axis 58 is journalled in suitable bearings 59 and 60. The free end 61 of the vane arm is formed as a contact lever movable over resistances 62 and 63 respectively which are electrically connected to points 64 and 65 respectively on the connections leading from contacts 48 and 49 to relay 53 of the steering rudder and to points 64' and 65' respectively on the connections leading from contacts 50, 51 to relay 54 of the ailerons.

The speedometer 19 when used for controlling the elevating rudder may effect its influence upon the motor A always in the same manner. When used, however, for controlling the motor B of the steering rudder, the direction of the control must be reversed according to the sense of the curve. This reversal of controlling direction is effected by two switching devices 66 and 67, comprising levers 68 and 69 respectively and contacts 70, 71 and 72, 73 respectively. The levers 68 and 69 preferably are mounted on the shaft 55 which also bears the arms 43, 44 and 45 and are electrically connected to the resistance contacts 21 and 21' respectively of the speedometer 19. If a curve to the right is to be taken the contacts 21 and 21' are connected to the contacts 71 and 73 designated with "R," if a left curve is meant connection is established between contacts 21 and 21' and contacts 70 and 72 respectively designated with "L." The contacts 70 to 73 of the switching devices 66 and 67 may be formed as resistances or they may be subdivided for the regulation of resistances, in order to be able to change the influence of the speedometer in the curves in accordance with the radius of the curve. The two switching devices 66 and 67 are moved when the shaft 55 is rotated by means of the hand wheel 56.

Contacts 70 and 73 are electrically connected to a point 74 situated on the connection going from contact 48 of regulating device 41 to relay 53 of a controlling means for the steering rudder. Contacts 71 and 72 are connected as at point 75 to the corresponding connection between contact 49 and relay 53. By these connections the speedometer 19 influences also the steering rudder in a manner corresponding to the radius of the curve so that all the displacements of the different rudders which are necessary for a complete speed regulation in a curve, are possible.

The motor C for the ailerons—when flying in a curve—is controlled by the regulating device 34 to 36 of gyroscope 33 and further by regulating device 42 which influences this motor in correspondence to the radius of the curve.

Having now particularly described my invention I beg to point out that the particular means shown in the drawings may be changed and be substituted by suitable other means without leaving the scope of the invention.

I claim:

1. Automatic apparatus for stabilizing airplanes, comprising gyroscopic controlling devices for stabilizing the airplane on a straight course, and means for causing said gyroscopic controlling devices—when flying in a curve—to exert an additional influence upon the airplane according to the necessities of stabilization in a curve.

2. Automatic apparatus for stabilizing airplanes, comprising gyroscopic controlling devices for stabilizing the airplane on a straight course, means for causing said gyroscopic controlling devices—when flying in a curve—to exert an additional influence upon the airplane, said means comprising regulating devices adapted to influence said gyroscopic controlling devices, and means for adjusting said regulating devices at will in correspondence with the radius of a curve.

3. Automatic apparatus for stabilizing airplanes, comprising gyroscopic controlling devices for stabilizing the airplane on a straight course, means for exerting—when flying in a curve—an additional gyroscopic controlling influence upon said gyroscopic controlling devices, said means comprising regulating devices adapted to influence said gyroscopic controlling devices, means for adjusting said regulating devices at will in correspondence with the radius of a curve, said adjusting means comprising a shaft and a hand wheel mounted on said shaft.

4. Automatic apparatus for stabilizing airplanes, comprising gyroscopic controlling devices for stabilizing the airplane on a straight course and when flying in a curve, regulating devices electrically connected to said gyroscopic controlling devices, and a hand-operated adjusting device for controlling said regulating devices in accordance with the direction of travel of the airplane.

5. Automatic apparatus for stabilizing airplanes, comprising gyroscopic controlling devices for stabilizing the airplane on a straight course, regulating devices electrically connected to said gyroscopic controlling devices, said regulating devices being controlled by a hand-operated adjusting device, said regulating devices each comprising a contact arm mounted upon a rotatable shaft and contact resistances electrically connected to a control device for moving one of the rudders, and hand-operated means mounted upon said shaft for rotating it.

6. Automatic apparatus for use in airplanes, comprising means for stabilizing the airplane on a straight course, additional means for stabilizing the airplane in a curve, means for adjusting said additional means at will, a motor for controlling the elevating rudder, a second motor for controlling the steering rudder, a third motor for controlling the ailerons, gyroscopic devices for electrically controlling each of the three motors, a measuring device adapted to respond to changes in the state of motion for controlling the gyroscopic device of said first motor, said additional means comprising a curve-switch electrically connected to each one of said gyroscopic devices.

7. Automatic apparatus for use in airplanes, comprising means for stabilizing the airplane on a straight course, additional means for stabilizing the airplane in a curve, means for adjusting said additional means at will, a motor for controlling the elevating rudder, a second motor for controlling the steering rudder, a third motor for controlling the ailerons, gyroscopic devices for electrically controlling each of the three motors, said additional means comprising a curve-switch electrically connected to each one of said gyroscopic devices, a measuring device adapted to respond to changes in the state of motion lateral in space and angular for controlling the gyroscopic device of said first motor, and electrical connections between said measuring device and the gyroscopic device of said second motor.

8. Automatic apparatus for use in airplanes, comprising means for stabilizing the airplane on a straight course, additional means for stabilizing the airplane in a curve, means for adjusting said additional means at will, a motor for controlling the elevating rudder, a second motor for controlling the steering rudder, gyroscopic devices for electrically controlling each of the two motors separately, said additional means comprising a curve-switch electrically connected to each one of said gyroscopic devices, a measuring device adapted to respond to changes in the state of motion lateral in space and angular for controlling the gyroscopic device of said first motor, regulating means electrically connected to said measuring device, electrical connections between said regulating means and said gyroscopic device of said second motor, and switching means for adjusting said regulating means in accordance to the conditions of the curve.

9. Automatic apparatus for stabilizing airplanes, comprising gyroscopic controlling devices for stabilizing the airplane on a straight course, means for causing said gyroscopic controlling devices—when flying in a curve—to exert an additional influence upon the airplane according to the necessities of stabilization in a curve, and a vane exerting a further additional influence by means of said gyroscopic controlling devices on the steering rudder and the ailerons in case of the plane sliding sidewise.

10. Automatic apparatus for stabilizing airplanes, comprising electrical controlling devices for stabilizing the airplane on a straight course, regulating devices electrically connected to said gyroscopic controlling devices, said regulating devices being controlled by a hand-operated adjusting device, and means mounted on the plane and being directly acted upon by the wind, said means being electrically connected to said electrical controlling devices.

In testimony whereof I affix my signature.
JOHANN MARIA BOYKOW.